No. 731,054. PATENTED JUNE 16, 1903.
M. L. HOYT.
JOURNAL BEARING.
APPLICATION FILED FEB. 18, 1901.
NO MODEL.
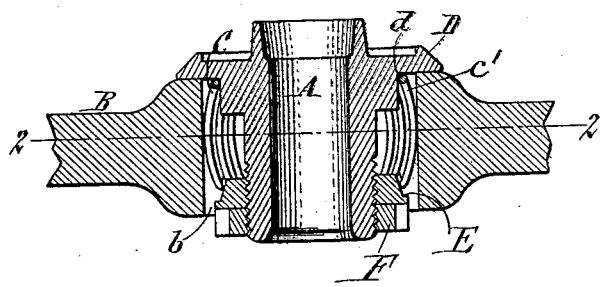
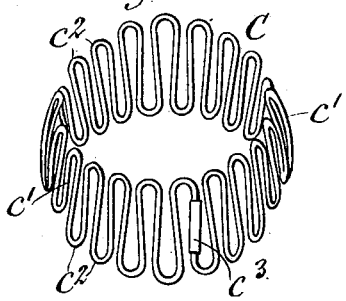
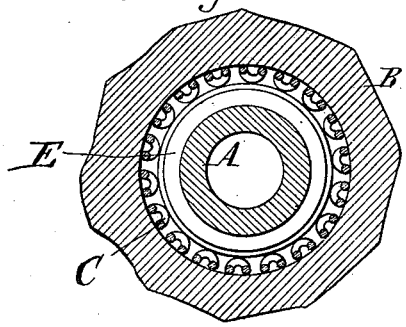
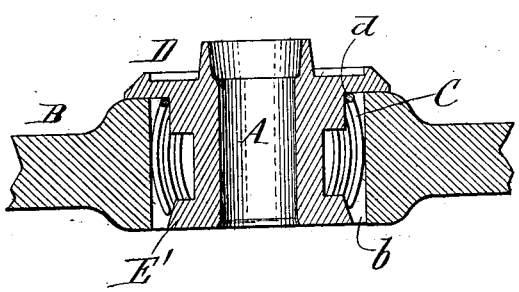
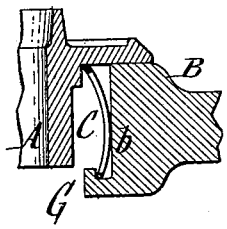 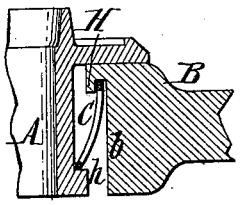 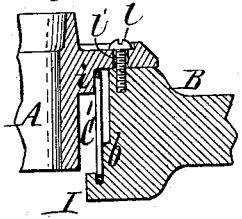 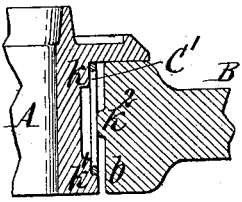
Witnesses:
Henry L. Deck.
F. F. Schirjinger
Matthew L. Hoyt Inventor.
By Wilhelm & Bonner
Attorneys.

No. 731,054. Patented June 16, 1903.

UNITED STATES PATENT OFFICE.

MATTHEW L. HOYT, OF LITTLEFALLS, NEW YORK, ASSIGNOR TO D. H. BURRELL & COMPANY, OF LITTLEFALLS, NEW YORK.

JOURNAL-BEARING.

SPECIFICATION forming part of Letters Patent No. 731,054, dated June 16, 1903.

Application filed February 18, 1901. Serial No. 47,821. (No model.)

*To all whom it may concern:*

Be it known that I, MATTHEW L. HOYT, a citizen of the United States, and a resident of Littlefalls, in the county of Herkimer and State of New York, have invented new and useful Improvements in Journal-Bearings, of which the following is a specification.

This invention relates to a spring-supported journal-bearing in which the bearing is surrounded by an annular spring or yielding support, which permits the bearing to shift its position and enables the spindle or shaft journaled in the bearing to assume that position in which the rotating part which is secured to the spindle or shaft runs steadily and without vibration. Spring-supported bearings of this kind are often employed for supporting the shafts or spindles of machines which rotate at a high speed. For instance, the upper or neck bearing of the spindle or shaft of a centrifugal creamer or separator is usually supported by an annular spring or elastic ring of rubber which is interposed between the bearing and the surrounding part of the stationary frame or case. These rubber rings are short-lived, owing to their exposure to the oil which is used for lubricating the spindle, and they often become twisted in such a way that they cause the bearing to bind on the shaft or spindle.

The object of my invention is to produce a durable and efficient spring-supported bearing in which the spring will retain its elasticity for a long time and will allow the bearing to yield readily in any direction, while properly supporting the bearing, and which is simple and cheap in construction.

In the accompanying drawings, Figure 1 is a vertical section of my improved spring-supported bearing. Fig. 2 is a horizontal section in line 2 2, Fig. 1. Fig. 3 is a detached perspective view of the spring. Fig. 4 is a vertical section showing a slightly-modified construction of the bearing. Figs. 5, 6, 7, and 8 are fragmentary vertical sections illustrating modified forms of the invention.

Like letters of reference refer to like parts in the several figures.

A represents the upper or neck bearing which is used in a centrifugal separator or creamer for supporting the spindle below the bowl. B is the part of the frame or case of the machine which surrounds and supports this bearing and which is provided with an upright cylindrical bore or seat $b$ for that purpose.

C is an annular spring of peculiar construction which is interposed between the bearing and the seat $b$ of the frame and which yieldingly supports the bearing in the same. This spring is bent or coiled of elastic wire alternately up and down or lengthwise of the bearing, so that the spring is composed of upright parts $c'$ and bends or bights $c^2$, which connect alternate opposite ends thereof. The ends of the wire of which this spring is formed are secured together by any suitable means—for instance, as indicated in Fig. 3, by inserting the ends in a sleeve $c^3$ and securing the parts by soldering. In the preferred construction of the spring (shown in Figs. 1 to 6) the upright parts of the coils are curved lengthwise and outwardly, so that the spring is highest at the middle or convex on its outer side and hollow or concave on its inner side. The spring is seated with its upper end against a shoulder $d$ on the under side of the top flange D of the bearing and with its lower end upon a cone which surrounds the lower end of the bearing. In Fig. 1 this cone E is shown vertically adjustable on the bearing for regulating the tension of the spring. For this purpose the lower portion of the bearing is screw-threaded and the cone E is provided with an internal thread, so that the cone can be screwed up and down on the bearing. The cone is secured in its adjusted position by a jam-nut F. In most cases it is not necessary to change the tension of the spring, and in those cases the cone is formed integrally with the lower end of the bearing, as shown at E' in Fig. 4. The spring is seated with its crowning or bulging middle portion against the inner side of the cylindrical seat or bore $b$ of the frame. The spring yields readily to the pressure of the bearing in any direction and allows the bearing to assume that position in which the bowl or other part secured to the spindle will run true. The spring cannot become twisted and always supports the bearing properly without causing the bearing to bind against the shaft or spindle. The spring is not affected by oil or other liquids and retains its elasticity for a long time, and it can be produced at small cost.

The foregoing construction and arrangement of the spring are preferred; but a spring of this kind can also be applied and constructed in other ways, some of which I will explain.

In the modified arrangement shown in Fig. 5 the spring C bears only at its upper end against the bearing and rests at its lower end in a grooved flange G, which projects inwardly from the lower portion of the seat $b$ of the frame.

In the modified arrangement shown in Fig. 6 the spring bears only at its lower end against the bearing, which is provided with a shoulder $h$ for that purpose, and rests at its upper end in a grooved flange H, which projects inwardly from the upper portion of the seat $b$ of the frame.

In the modified construction of the spring represented in Fig. 7 the coils of the spring C' are not convex on one side and concave on the other, but are substantially of straight cylindrical form. The spring rests at its lower end in an annular grooved flange I, which projects inwardly from the lower portion of the seat $b$ of the frame and which confines the spring on its inner and outer sides. The spring bears at its upper end against a shoulder $i$ on the bearing. The bearing may be held down on the frame B by a screw $l$, which passes through a hole $l'$ in the top flange of the bearing of sufficient size to permit of the required lateral play of the bearing.

In the modified construction represented in Fig. 8 the spring is of straight cylindrical form, as in Fig. 7, but bears at its upper and lower ends against shoulders $k\ k'$ on the bearing and at its middle against an annular projection $k^2$ in the seat $b$ of the frame.

I claim as my invention—

1. The combination with a journal-bearing and the surrounding frame, of an interposed annular supporting-spring composed of a series of coils which trend lengthwise of the bearing, substantially as set forth.

2. The combination with a journal-bearing and the surrounding frame, of an interposed annular supporting-spring which is composed of a series of coils trending lengthwise of the bearing and which is seated at its upper and lower ends against the bearing and at an intermediate line against the frame, substantially as set forth.

3. The combination with a journal-bearing and the surrounding frame, of an interposed annular supporting-spring composed of a series of coils which trend lengthwise of the bearing, the lengthwise portions of the coils being convex on their outer sides, substantially as set forth.

4. The combination with a stand, a rotary shaft, and a box or sleeve arranged within the stand and forming a bearing for said shaft, of a coiled spring encircling said sleeve, the several coils thereof each presenting opposite points of engagement with the sleeve and stand, substantially as set forth.

5. The combination with a stand, a rotary shaft, and a box or sleeve arranged within the stand and forming a bearing for said shaft, of a coiled spring having a turn or bend on itself to enter the annular aperture between the stand and the box or sleeve, the several coils of said spring individually presenting opposite bearings on the box or sleeve and the stand, substantially as set forth.

6. The combination with a stand, a box or sleeve, and a rotary shaft within said box or sleeve, of a spring comprising a multiplicity of coils, each coil of which bears oppositely against the box or sleeve and the stand, and means for preventing said spring from falling from its operative position between the sleeve and the stand, substantially as set forth.

Witness my hand this 9th day of February, 1901.

MATTHEW L. HOYT.

Witnesses:
D. H. BURRELL, Jr.,
FREDERICK C. PHILLIPS.